United States Patent
Ohata (10) Patent No.: US 8,717,590 B2
(45) Date of Patent: May 6, 2014

(54) IMAGE FORMING APPARATUS, METHOD FOR CONTROLLING THE SAME, AND COMPUTER-READABLE RECORDING MEDIUM

(75) Inventor: Tsutomu Ohata, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 79 days.

(21) Appl. No.: 13/528,996

(22) Filed: Jun. 21, 2012

(65) Prior Publication Data

US 2013/0003095 A1    Jan. 3, 2013

(30) Foreign Application Priority Data

Jun. 28, 2011   (JP) .................................. 2011-142516

(51) Int. Cl.
*G06F 3/12* (2006.01)
*G06F 1/32* (2006.01)
*H04N 1/405* (2006.01)

(52) U.S. Cl.
CPC ............ *G06F 1/3284* (2013.01); *H04N 1/4051* (2013.01)
USPC ....................................... 358/1.13; 358/1.14

(58) Field of Classification Search
CPC ................. H04N 2201/0094; H04N 1/00896; H04N 1/00985; H04N 1/00891; H04N 2201/0082; H04N 1/4051; G06F 1/3284; G06F 3/12; G06F 3/1221; G06F 3/1204; G06F 1/3203; G06F 1/325; G06F 15/00
USPC ................................ 358/1.14, 1.13
See application file for complete search history.

(56) References Cited

U.S. PATENT DOCUMENTS

| | | | |
|---|---|---|---|
| 7,526,318 B2* | 4/2009 | Asada ............................ | 455/558 |
| 7,978,355 B2* | 7/2011 | Suzuki et al. ................ | 358/1.14 |
| 2002/0049873 A1 | 4/2002 | Mikuni et al. | |
| 2002/0109857 A1* | 8/2002 | Ueno et al. .................... | 358/1.14 |
| 2009/0327808 A1* | 12/2009 | Takizawa ........................ | 714/24 |
| 2010/0231966 A1 | 9/2010 | Todaka | |
| 2011/0194133 A1* | 8/2011 | Fujisawa ....................... | 358/1.13 |
| 2012/0128357 A1* | 5/2012 | Mukai et al. .................... | 398/58 |
| 2012/0272084 A1* | 10/2012 | Tsuji ............................. | 713/324 |

FOREIGN PATENT DOCUMENTS

| | | | |
|---|---|---|---|
| JP | 2006-121742 A | 5/2006 |
| JP | 2006-148838 A | 6/2006 |
| JP | 2007-282117 A | 10/2007 |
| JP | 2008-271118 A | 11/2008 |
| JP | 2010-219630 A | 9/2010 |

* cited by examiner

*Primary Examiner* — Jerome Grant, II
(74) *Attorney, Agent, or Firm* — Buchanan Ingersoll & Rooney PC (57) ABSTRACT

In an image forming apparatus, when a first state (which allows a process of accepting a job involving image processing) continues over a shift timer period without reception of an execution request for the job, a state control part performs an operation of shifting from the first state to a second state (which is lower in power consumption than the first state). Moreover, in a case where job acceptance started in the second state on the basis of a first execution request is failed and job acceptance started in the second state on the basis of a second execution request is also failed, the shift timer period is extended on the basis of a differential value of a difference between a first execution request reception time and a second execution request reception time, and a third execution request for the job in the first state is awaited.

18 Claims, 7 Drawing Sheets

| DATA NUMBER | FIRST ARRIVAL TIME (HH:MM:SS) | SECOND ARRIVAL TIME (HH:MM:SS) | TRANSMITTING-SIDE RETRY TIME (MM:SS) | RETRY WAIT TIMERSETTING TIME (MM:SS) |
|---|---|---|---|---|
| 1 | 20:15:58 | 20:18:35 | 02:37 | 03:07 |

IMAGE FORMING APPARATUS, METHOD FOR CONTROLLING THE SAME, AND COMPUTER-READABLE RECORDING MEDIUM

This application is based on Japanese Patent Application No. 2011-142516 filed on Jun. 28, 2011, the contents of which are hereby incorporated by reference.

BACKGROUND OF THE INVENTION

1. Field of the Invention

The present invention relates to an image forming apparatus such as an MFP (Multi-Functional Peripheral) and techniques concerning the same, particularly, a technique of reducing power consumption.

2. Description of the Background Art

In an image forming apparatus such as an MFP (a so-called complex machine), a power saving mode (e.g., an energy saving mode, a sleep mode) is set for achieving low power consumption.

For example, JP 2007-282117 A discloses an image forming apparatus having a print mode in which the image forming apparatus performs a printing operation, a standby mode (a normal standby mode) in which the image forming apparatus awaits data, and an energy saving mode (a power saving mode) which is lower in power consumption than the standby mode (the normal standby mode). The image forming apparatus shifts to the normal standby mode after performing the printing operation, and then shifts to the energy saving mode when a predetermined shift time is elapsed without reception of a job in the normal standby mode. Thus, reduction in power consumption is achieved.

When receiving an execution request for a job from the outside in the power saving mode, the image forming apparatus returns from the power saving state (the power saving mode) to the normal standby state (the normal standby mode) (or the print mode or the like) in response to the reception of the execution request for the job, and then starts to perform a process of receiving the job, and the like.

However, the image forming apparatus requires a considerable time until the image forming apparatus returns from the power saving state (e.g., the sleep mode) to the state in which the image forming apparatus stands ready to receive the job (the data). Depending on situations, therefore, when receiving an execution request for a job (e.g., a facsimile receiving job) from the outside in the sleep state, the image forming apparatus fails to accept the job in some instances.

With regard to a facsimile receiving job, there exists a technique of receiving and displaying a telephone number (specifically, a facsimile number) of a counterpart (a transmitting side), for example. In a case where the facsimile receiving job is received in the sleep mode (the sleep state), a notification about the telephone number of the counterpart (the transmitting side) has already been provided at the time when the operation of returning from the sleep state is completed, so that the reception of the telephone number is failed in some instances. Particularly, in a case where the image forming apparatus is set so as to determine that a facsimile receiving job is received successfully on condition that a telephone number of a counterpart is acquired, the image forming apparatus fails to receive (accept) the facsimile receiving job.

In order to achieve further reduction in power consumption, preferably, a shift time (a timer period) from the normal state (the normal standby state) to the power saving state (the sleep state) is set to be relatively shorter. However, the short timer period is apt to result in the reception failure described above. On the other hand, when the timer period is set to be longer in order to avoid the reception failure, an effect of reducing power consumption is reduced.

SUMMARY OF THE INVENTION

It is an object of the present invention to provide an image forming apparatus capable of preventing degradation in power saving property and accepting a job from an external apparatus with higher reliability, and a technique concerning the same.

A first aspect of the present invention is directed to an image forming apparatus including: a reception part for receiving an execution request for a job involving image processing from an external apparatus; and a state control part for switching between a first state which allows a process of accepting the job and a second state which is lower in power consumption than the first state, wherein when the first state continues over a shift timer period without reception of the execution request, the state control part performs an operation of shifting from the first state to the second state, when reception of the job is started in the second state in response to the execution request, the state control part performs an operation of shifting from the second state to the first state in order to perform the process of accepting the job, and in a case where job acceptance started in the second state on the basis of a first execution request is failed and job acceptance started in the second state on the basis of a second execution request is also failed, the state control part extends the shift timer period on the basis of a differential value of a difference between a first execution request reception time and a second execution request reception time, and causes the reception part to await a third execution request for the job in the first state.

A second aspect of the present invention is directed to a method for controlling an image forming apparatus, including the steps of: (a) performing an operation of shifting from a first state in which an execution request for a job involving image processing is awaited to a second state which is lower in power consumption than the first state when the first state continues over a shift timer period without reception of the execution request; (b) performing an operation of shifting from the second state to the first state in order to perform a process of accepting the job when reception of the job is started in the second state in response to the execution request; and (c) extending, in a case where job acceptance started in the second state on the basis of a first execution request is failed and job acceptance started in the second state on the basis of a second execution request is also failed, the shift timer period on the basis of a differential value of a difference between a first execution request reception time and a second execution request reception time, and awaiting a third execution request for the job in the first state.

A third aspect of the present invention is directed to a non-transitory computer-readable recording medium for recording a program that causes a computer incorporated in an image forming apparatus to execute the steps of: (a) performing an operation of shifting from a first state in which an execution request for a job involving image processing is awaited to a second state which is lower in power consumption than the first state when the first state continues over a shift timer period without reception of the execution request; (b) performing an operation of shifting from the second state to the first state in order to perform a process of accepting the job when reception of the job is started in the second state in response to the execution request; and (c) extending, in a case where job acceptance started in the second state on the basis of a first execution request is failed and job acceptance started in the second state on the basis of a second execution request is also failed, the shift timer period on the basis of a differential value of a difference between a first execution request reception time and a second execution request reception time, and awaiting a third execution request for the job in the first state.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a configuration concerning a facsimile communication part, an overall control part and the like;

DESCRIPTION OF PREFERRED EMBODIMENTS

With reference to the drawings, hereinafter, description will be given of preferred embodiments of the present invention.

1. Configuration

Figure 1:
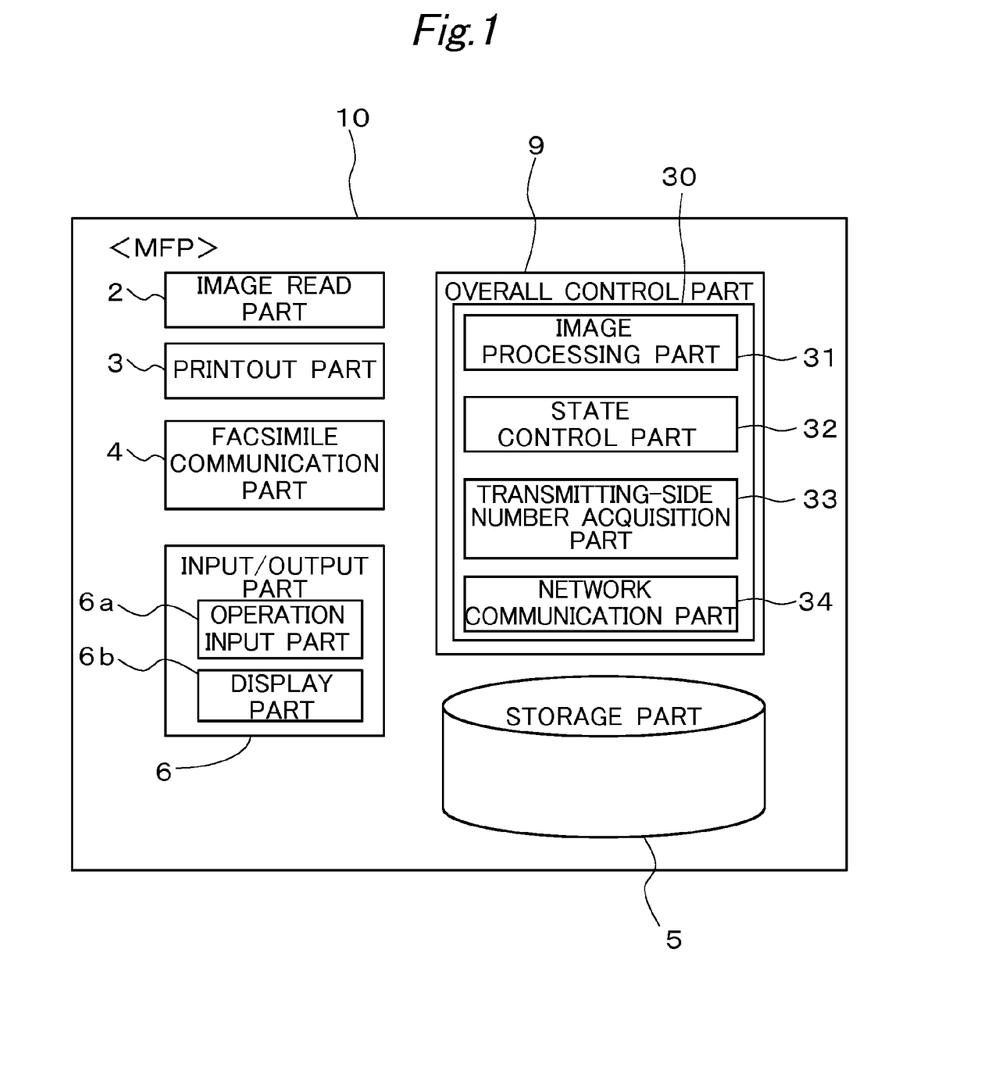
FIG. 1 is a block diagram showing a schematic configuration of an image forming apparatus.

FIG. 1 is a block diagram showing a schematic configuration of an image forming apparatus 10. The image forming apparatus 10 is configured as an MFP (Multi-Functional Peripheral) in this embodiment.

As shown in FIG. 1 (the block diagram), the image forming apparatus 10 includes an image read part 2, a printout part 3, a facsimile communication part 4, a storage part 5, an input/output part 6, an overall control part 9 and the like. These parts are operated in combination to realize various functions.

The image read part 2 is a processing part that optically reads a document placed at a predetermined position on the image forming apparatus 10 to generate image data of the document (also referred to as a document image).

The printout part 3 is an output part that prints out an image onto a medium such as a sheet of paper on the basis of data about a print target.

The facsimile communication part 4 is a processing part that allows establishment of facsimile communication using a public line or the like.

The storage part 5 is a storage device such as an HDD (Hard Disk Drive), and stores therein a document image (image data) generated by the image read part 2 and the like.

The input/output part 6 includes an operation input part 6a that accepts an input to the image forming apparatus 10, and a display part 6b that displays (outputs) various information. Specifically, the image forming apparatus 10 is equipped with an operation panel 6c (not shown). The operation panel 6c is a touch screen that includes a liquid crystal display panel and a piezoelectric sensor and the like each embedded in the liquid crystal display panel. The operation panel 6c serves as the display part 6b, and also serves as the operation input part 6a.

The overall control part 9 is a control device that is incorporated in the image forming apparatus 10 to collectively control the image forming apparatus 10. The overall control part 9 (specifically, a controller 30) is configured as a computer system that includes a CPU, various semiconductor memories (e.g., a RAM, a ROM) and the like. In the overall control part 9, the CPU executes a predetermined software program (hereinafter, simply referred to as a program) stored in the ROM (e.g., an EEPROM) to realize various processing parts. Herein, the program may be downloaded via a network or may be read from a non-transitory (or portable) recording medium (e.g., a USB memory), and then may be installed in the image forming apparatus 10.

Specifically, the controller 30 of the overall control part 9 includes an image processing part 31, a state control part 32, a transmitting-side number acquisition part 33, a network communication part 34 and the like.

The image processing part 31 is a processing part that controls various image processing in the image forming apparatus 10.

The state control part 32 is a processing part that controls an operation state (an operation mode) of the image forming apparatus 10, and is also referred to as a mode control part.

Particularly, the state control part 32 controls an operation state of the image forming apparatus 10 in such a situation that the image forming apparatus 10 is not operated to perform a printing operation and the like (a non-operative situation). In other words, the state control part 32 controls a state in which the image forming apparatus 10 awaits an execution request RQ for a job involving image processing (e.g., a facsimile receiving job involving a process of receiving image data, and the like), and the like.

The state control part 32 switches, as the non-operative state (the state in which the printing operation and the like are not performed), a standby state (a normal standby state) ST1 which allows a process of accepting a job and a power saving state (a sleep state) ST2 which is lower in power consumption than the normal standby state ST1. Herein, the normal standby state ST1 also indicates a state (a standby state) of the image forming apparatus 10 in a "normal standby mode", and the power saving state ST2 also indicates a state (a standby state) of the image forming apparatus 10 in a "power saving mode (a sleep mode)". The power saving state ST2 also indicates a state that allows further reduction in power consumption as compared with the normal standby state ST1.

As will be described later, specifically, when the image forming apparatus 10 remains on the normal standby state ST1 over a shift timer period TM without reception of an execution request for a job, the state control part 32 performs an operation of shifting the image forming apparatus 10 from the normal standby state ST1 to the power saving state ST2. Thus, reduction in power consumption is achieved. When the image forming apparatus 10 starts to receive a job (e.g., a facsimile receiving job) in the power saving state ST2 in response to an external execution request for the job, the state control part 32 performs an operation of shifting the image forming apparatus 10 from the power saving state ST2 to the normal standby state ST1 such that the image forming apparatus 10 performs a process of accepting the job. Further, the state control part 32 also performs an operation of shifting the image forming apparatus 10 from the normal standby state ST1 to an operative state.

In a case of receiving the facsimile receiving job in the normal standby state ST1, the image forming apparatus 10 is capable of immediately and successfully accepting the facsimile receiving job (in principle). On the other hand, when accepting the facsimile receiving job in the power saving state ST2, the image forming apparatus 10 returns from the normal standby state ST1 and then performs the process of accepting the facsimile receiving job. In other words, the normal standby state ST1 also indicates a state which allows immediate acceptance of a facsimile receiving job and the like, and the power saving state ST2 also indicates a state which does not allow at least immediate acceptance of a facsimile receiving job and the like.

Moreover, the state control part 32 determines whether or not the facsimile receiving job is accepted successfully, and then controls the state shifting operation on the basis of the result of determination. The detailed description thereof will be given later.

The transmitting-side number acquisition part 33 is a processing part that acquires number information of a facsimile receiving job transmitting side. In this embodiment, the transmitting-side number acquisition part 33 receives "transmitting-side number information" to be transmitted prior to facsimile data in association with a call signal for facsimile communication, and then acquires number information (a telephone number (specifically, a facsimile number)) of a transmitting side. Moreover, the transmitting-side number acquisition part 33 determines whether or not the transmitting-side number information is acquired successfully (success or failure).

The network communication part 34 is a processing part that controls network communication established between the image forming apparatus 10 and an external apparatus. The network communication part 34 allows network communication established via a communication network through the use of a network controller or the like in the overall control part 9. Various protocols such as a TCP/IP (Transmission Control Protocol/Internet Protocol) and an FTP (File Transfer Protocol) are used for the network communication. The use of the network communication allows exchange of various data between the image forming apparatus 10 and a desired counterpart.

Figure 2:
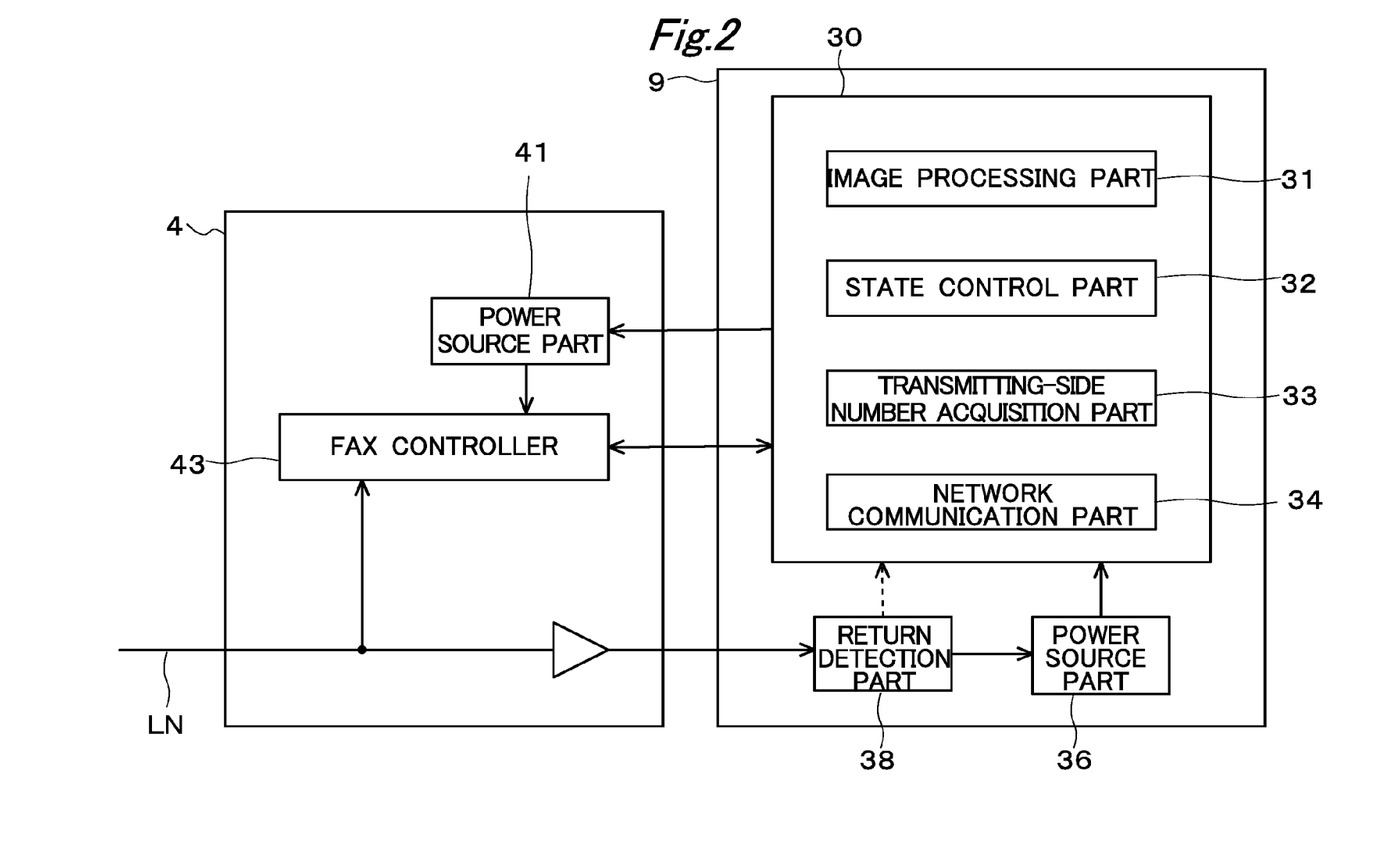

FIG. 2 is a block diagram showing a configuration mainly concerning the facsimile communication part 4, the overall control part 9 and the like.

The facsimile communication part 4 includes a power source part 41 and a controller 43 for facsimile communication. The controller 43 is a processing part that controls an operation of establishing facsimile communication. The power source part 41 is a power supply part that supplies electric power to the controller 43.

In addition to the controller 30, moreover, the overall control part 9 includes a power source part 36 and a return detection part 38.

The power source part 36 is a power supply part that supplies electric power to the controller 30.

The return detection part 38 is a processing part that detects a call signal for facsimile communication as a "return signal". The return detection part 38 has a timer counter, and is capable of detecting a time upon detection of a call signal for facsimile communication (a time at which the image forming apparatus 10 starts to receive a facsimile receiving job).

In the power saving state ST2, the power source part 36 supplies no electric power to the controller 30 and the power source part 41 also supplies no electric power to the controller 43. In other words, the power supply to each of the controllers 30 and 43 is interrupted. The image forming apparatus 10 remains on the power saving state ST2 until the return detection part 38 detects a call signal for facsimile communication. When the return detection part 38 detects the call signal, the image forming apparatus 10 shifts from the power saving state ST2 to the normal standby state ST1 (or the operative state).

The shift from the power saving state ST2 to the normal standby state ST1 is realized as follows.

First, when a call signal to be transmitted via a telephone line LN is detected by the return detection part 38, a power supply restart signal (a command signal) is transmitted from the return detection part 38 to the power source part 36. Thus, the power source part 36 restarts the power supply to the controller 30. After the activation (the return) of the controller 30 by the restart of power supply, then, the controller 30 transmits a power supply restart signal to the power source part 41 in order to supply electric power to the controller 43 of the facsimile communication part 4. Thus, the power source part 41 restarts the power supply to the controller 43. After the activation (the return) by the restart of power supply, the controller 43 performs an operation of receiving (accepting) facsimile communication data (also referred to as facsimile reception data or simply facsimile data). As described above, each of the controllers 43 and 30 receives an execution request for a facsimile receiving job from the outside to accept the facsimile receiving job.

In the case where the image forming apparatus 10 successfully receives the facsimile data (in the case where the image forming apparatus 10 successfully accepts the facsimile receiving job), the printout part 3 performs a printout process based on the facsimile data under the control by the controller 30.

In the operations described above, however, the image forming apparatus 10 fails to successfully accept the facsimile receiving job in some instances depending on a length of a period from a timing of the detection of the call signal by the return detection part 38 to a timing of the return of the controller 43, and other factors. In the case where the facsimile receiving job involves reception of transmitting-side number information (caller number information), particularly, the image forming apparatus 10 is incapable of receiving the transmitting-side number information to be transmitted prior to the facsimile data (the main data) in association with the call signal, and therefore fails to successfully accept the facsimile receiving job.

It is assumed herein that the image forming apparatus 10 is set so as to determine that a facsimile receiving job is received successfully on condition that a telephone number (specifically, a facsimile number) of a counterpart (a transmitting side) is acquired. It is also assumed herein that when receiving the facsimile receiving job in the power saving state (the sleep state) ST2, the image forming apparatus 10 returns from the power saving state ST2 to the operative state behind schedule, so that the image forming apparatus 10 fails to receive the telephone number of the counterpart and also fails to accept the facsimile receiving job.

Therefore, the normal standby state ST1 also indicates a state which allows successful reception of "a facsimile receiving job involving acquisition of telephone number information of a counterpart", and the power saving state ST2 also indicates a state which does not allow successful reception of "the facsimile receiving job involving the acquisition of the telephone number information of the counterpart".

2. Operations

2-1. Operations According to a Comparative Example

Prior to the description of the operations according to this embodiment, first, description will be given of operations according to a comparative example.

Figure 7:
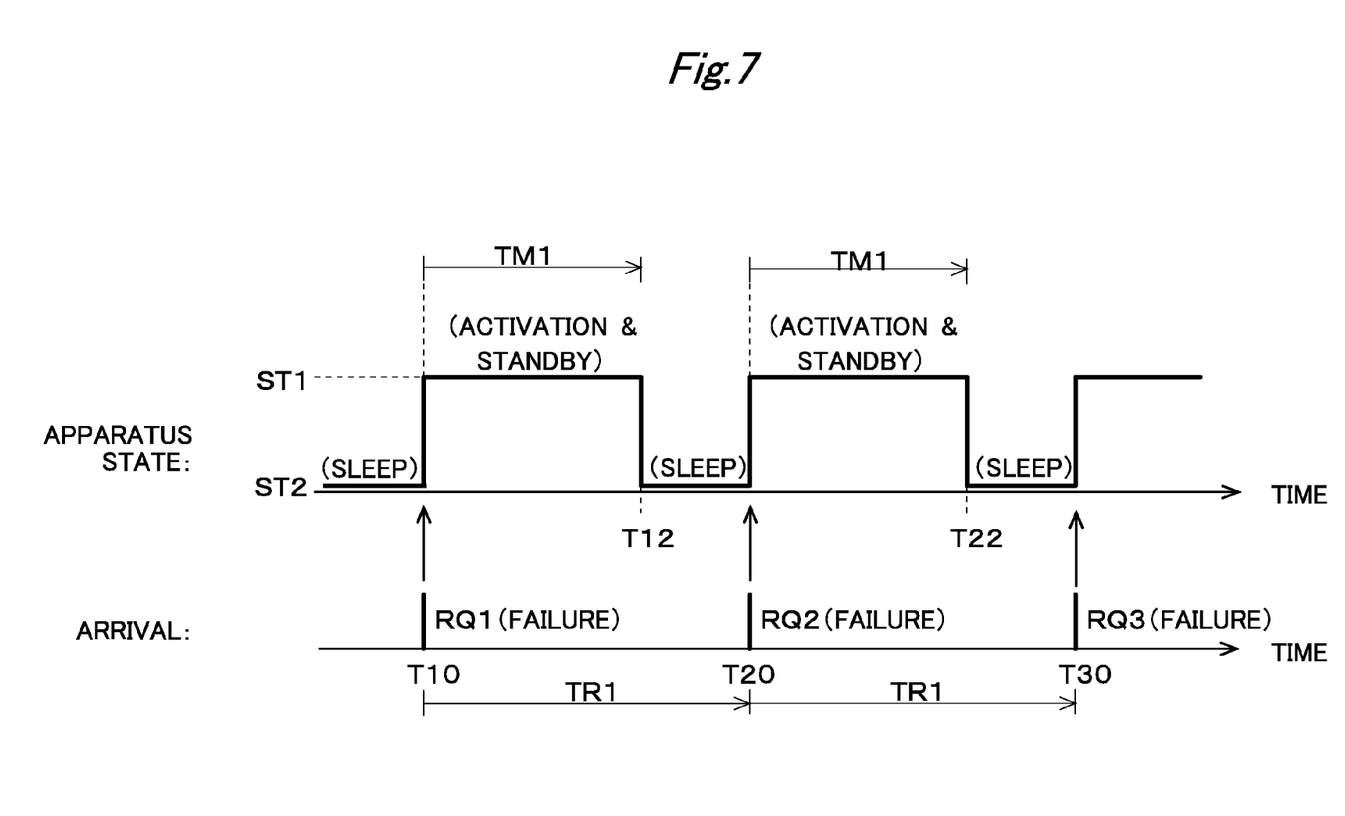
FIG. 7 is a timing chart showing operations according to a comparative example.

FIG. 7 is a timing chart showing operations of a receiving-side apparatus according to the comparative example.

It is assumed in this comparative example that a transmitting-side apparatus repeatedly transmits facsimile data to a receiving-side apparatus at predetermined retry time intervals TR1 until the receiving-side apparatus successfully receives the facsimile data (retry transmission). Herein, the retry time interval TR1 is set by the transmitting-side apparatus. It is also assumed that a shift time (a shift timer period) TM from a normal standby state ST1 (a normal standby mode) to a power saving state ST2 (a sleep mode) is fixed at a value TM1 set by a user in the receiving-side apparatus. It is also assumed that the shift timer period TM1 is shorter than the retry time interval TR1.

As shown in FIG. 7, at a certain time T10, the receiving-side apparatus in the power saving state ST2 receives an execution request RQ1 for a facsimile receiving job. In other words, the receiving-side apparatus starts to receive the facsimile receiving job. The receiving-side apparatus starts to return from the power saving state ST2 in response to the execution request RQ1 for the facsimile receiving job. However, the receiving-side apparatus requires much time until it stands ready to receive the facsimile receiving job (the data), and therefore cannot successfully receive the facsimile receiving job. In other words, the receiving-side apparatus fails to receive the facsimile receiving job.

After a lapse of the shift timer period TM1, the receiving-side apparatus shifts to the power saving state ST2 again (at a time T12).

Then, the transmitting-side apparatus starts to retransmit the facsimile data at a time T20 (a time after the lapse of the retry time interval TR1 from the time T10). In response to this retry transmission, the receiving-side apparatus receives a second execution request RQ2 for the facsimile receiving job at the time T20.

The receiving-side apparatus in the power saving state ST2 starts to return from the power saving state ST2 in response to the execution request RQ2 for the facsimile receiving job. However, the receiving-side apparatus requires much time until it stands ready to receive the facsimile receiving job, and therefore cannot successfully receive the facsimile receiving job. In other words, the receiving-side apparatus fails to receive the facsimile receiving job again.

After a lapse of the shift timer period TM1, the receiving-side apparatus shifts to the power saving state ST2 again (at a time T22).

Moreover, the transmitting-side apparatus starts to retransmit the facsimile data at a time T30 (a time after a lapse of the retry time interval TR1 from the time T20). In response to this retry transmission, the receiving-side apparatus receives a third execution request RQ3 for the facsimile receiving job at a time T30.

The receiving-side apparatus in the power saving state ST2 starts to return from the power saving state ST2 in response to the execution request RQ3 for the facsimile receiving job. However, the receiving-side apparatus requires much time until it stands ready to receive the facsimile receiving job, and therefore cannot successfully receive the facsimile receiving job. In other words, the receiving-side apparatus fails to receive the facsimile receiving job again.

The foregoing operations are performed repeatedly depending on situations.

2-2. Operations According to this Embodiment

Next, description will be given of the operations according to this embodiment.

Figure 4:
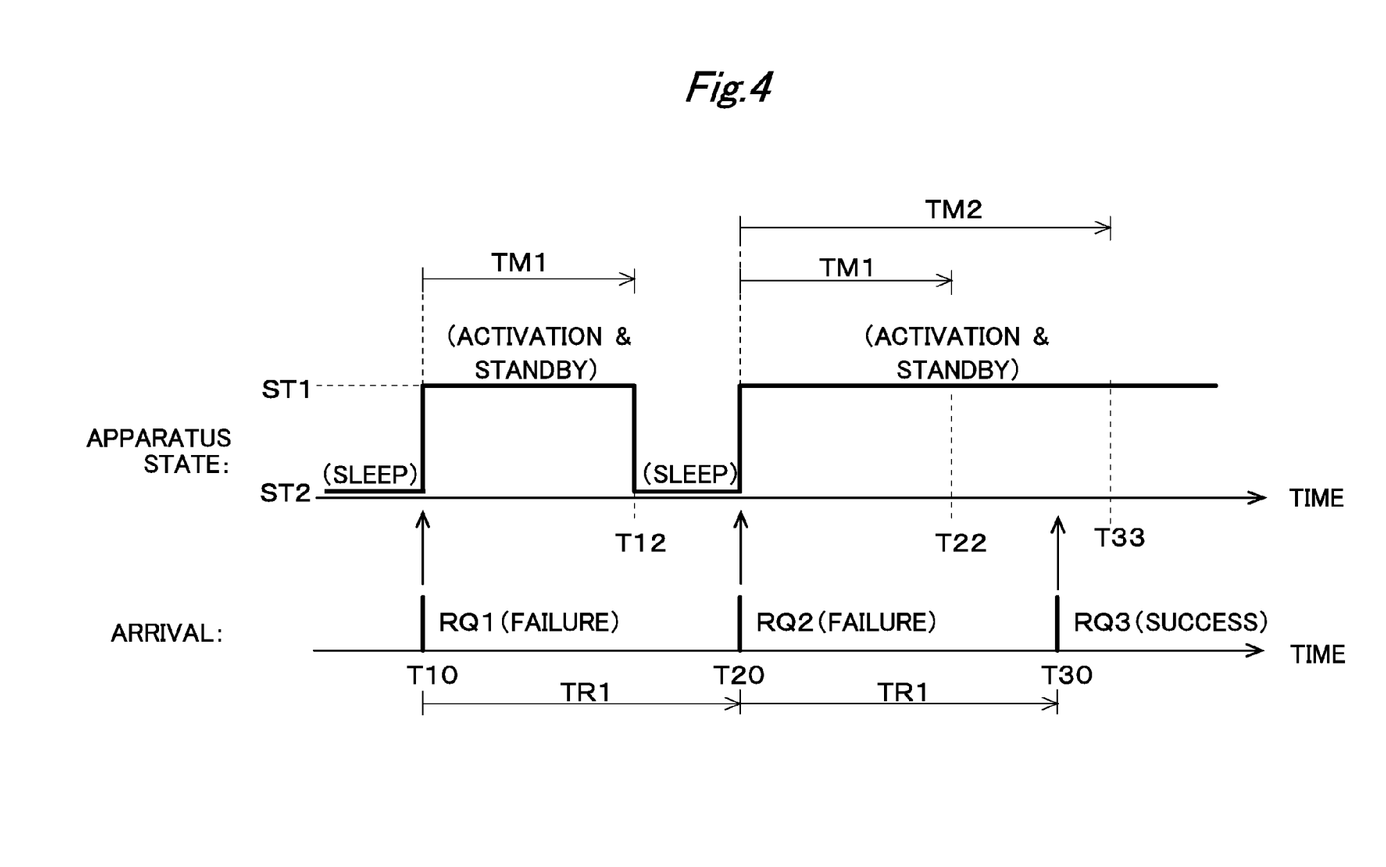
FIG. 4 is a timing chart showing the operations of the image forming apparatus.

FIG. 4 is a timing chart showing the operations of the image forming apparatus 10.

It is also assumed in FIG. 4 that a transmitting-side apparatus repeatedly transmits facsimile data to a receiving-side apparatus (the image forming apparatus 10) at predetermined retry time intervals TR1 (retry transmission). The retry time interval TR1 is set by the transmitting-side apparatus.

In the receiving-side apparatus (the image forming apparatus 10), however, a shift time (a shift timer period) TM from the normal standby state ST1 (the normal standby mode) to the power saving state ST2 (the sleep mode) is not fixed at a value set by a user, but can be extended. Specifically, the image forming apparatus 10 is capable of changing the shift timer period TM from a value TM1 set by a user to a different value TM2. In other words, the image forming apparatus 10 is capable of extending the shift timer period TM. Herein, the value TM2 is larger than the value TM1. As will be described later, the value TM2 is set on the basis of a differential value of a difference between times at which the image forming apparatus 10 fails successively twice to receive the facsimile receiving job. It is also assumed herein that the shift timer period TM set at the original value TM1 is shorter than the retry time interval TR1.

In FIG. 4, operations to be performed at a time T20 or earlier are similar to those in FIG. 7.

At a time T10, the image forming apparatus 10 (the receiving-side apparatus) starts to return from the power saving state ST2 in response to arrival of a facsimile receiving job (reception of an execution request RQ1). However, the image forming apparatus 10 requires much time until it stands ready to receive the facsimile receiving job (the facsimile data), and therefore fails to accept the facsimile receiving job. At the time T20, moreover, the image forming apparatus 10 (the receiving-side apparatus) starts to return from the power saving state ST2 in response to re-arrival of the facsimile transmitting job (reception of an execution request RQ2). However, the image forming apparatus 10 requires much time until it stands ready to receive the facsimile receiving job, and therefore fails to accept the facsimile receiving job again.

Figure 5:
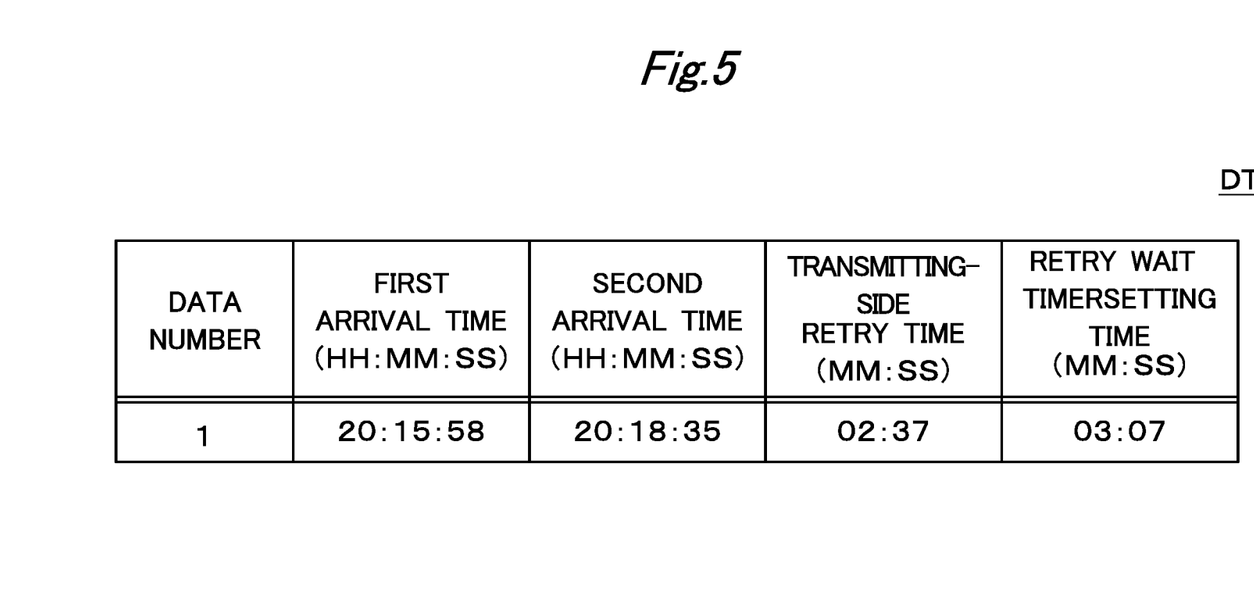
FIG. 5 is a diagram showing failure history data about a facsimile receiving job.

Herein, the return detection part 38 detects information about the time T10 at which the image forming apparatus 10 fails to receive the facsimile receiving job for the first time (the arrival time) and the time T20 at which the image forming apparatus 10 fails to receive the facsimile receiving job for the second time (the arrival time). The detected information is contained in failure history data DT (see FIG. 5). FIG. 5 is a diagram showing the failure history data DT about the facsimile receiving job. The failure history data DT refers to data about a history of job failures, and is stored in the storage part 5 of the image forming apparatus 10.

When failing successively twice to receive the facsimile data, the image forming apparatus 10 calculates a differential value TD of a difference between the first facsimile receiving job reception time T10 and the second facsimile receiving job reception time T20 immediately after the time T20 (TD=T20−T10).

As shown by the data DT in FIG. 5, in the case where the first reception time (arrival time) T10 is "20 hr 15 min 58 sec" and the second reception time (arrival time) T20 is "20 hr 18 min 35 sec", the image forming apparatus 10 calculates "2 min 37 sec" as the differential value TD of the difference between the two reception times T10 and T20.

Alternatively, in the case where the first reception time (arrival time) T10 is "23 hr 45 min 32 sec" and the second reception time (arrival time) T20 is "23 hr 46 min 53 sec", the image forming apparatus 10 calculates "1 min 21 sec" as the differential value TD of the difference between the two reception times T10 and T20 (TD=T20−T10).

The state control part 32 makes such estimation that the differential value TD refers to a value corresponding to the retry time interval TR1 of the transmitting-side apparatus. Herein, the state control part 32 makes this estimation on assumption that the first facsimile receiving job and the second facsimile job are transmitted from a single person (i.e., the facsimile receiving jobs are identical with each other).

Then, the state control part 32 sets a value (e.g., "3 min 7 sec") obtained by adding a predetermined allowance value α(>0) (e.g., 30 seconds) to the differential value TD at the new value TM2 for extending the shift timer period TM.

Thereafter, the state control part 32 continues the normal standby state (the normal standby mode) until a time T33 (a time elapsed until the duration of the normal standby state (the normal standby mode) from the time T20 comes to the time corresponding to the value TM2). In other words, the image forming apparatus 10 remains on the normal standby state (the normal standby mode) although the duration of the normal standby state (the normal standby mode) exceeds the time corresponding to the value TM1.

At the time T30 until which the image forming apparatus 10 remains on the normal standby state ST1 (the time after the lapse of the retry time interval TR1 from the time T20), the transmitting-side apparatus starts to perform the operation of transmitting the facsimile data for a third time to the image forming apparatus 10.

Herein, the image forming apparatus 10 (the receiving-side apparatus) is not in the power saving state ST2, but in the normal standby state ST1. Accordingly, the image forming apparatus 10 is capable of successfully receiving the facsimile receiving job. In other words, the receiving-side apparatus succeeds in the reception of the facsimile receiving job.

Figure 3:
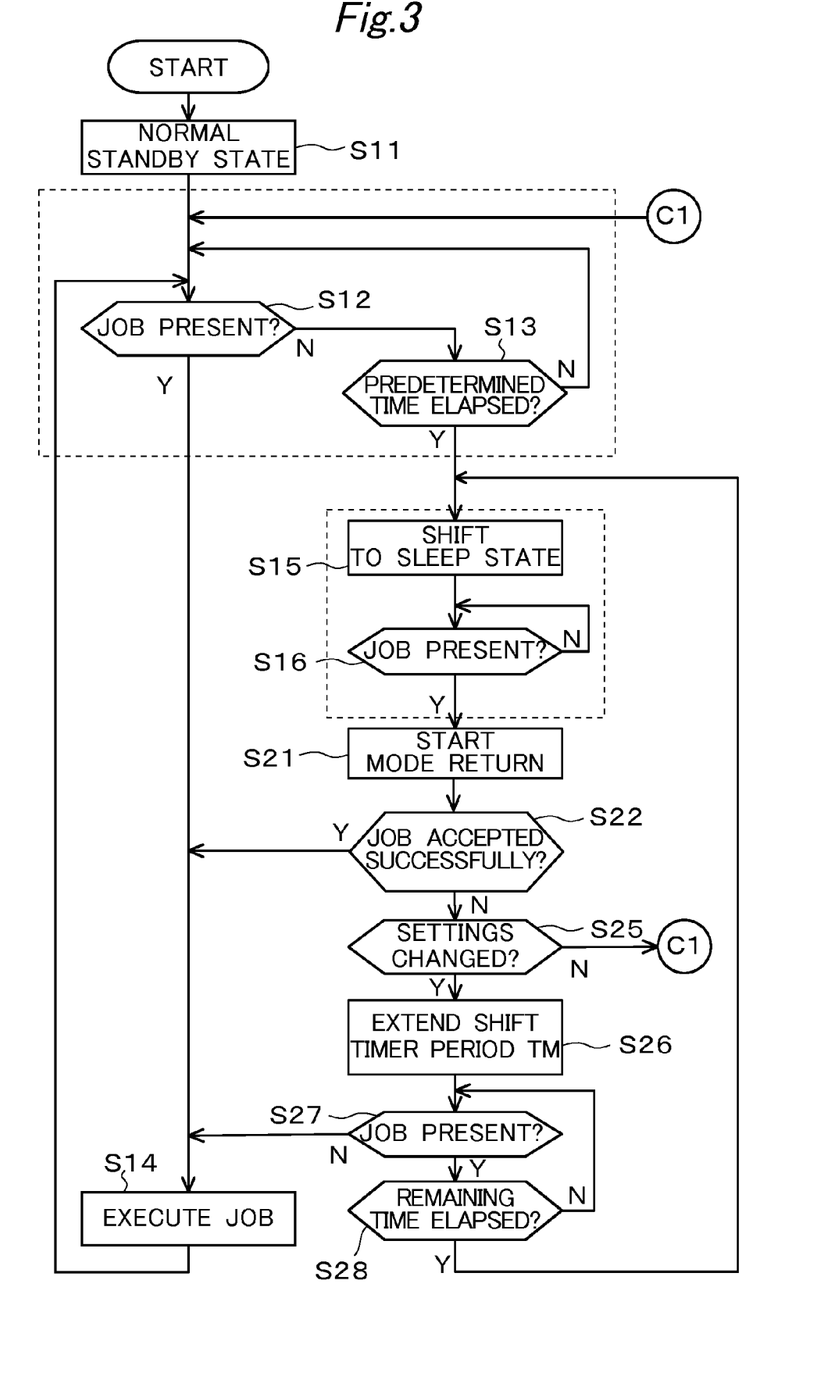
FIG. 3 is a flowchart showing operations of the image forming apparatus.

FIG. 3 is a flowchart showing the operations of the image forming apparatus 10. With reference to FIG. 3, the foregoing operations will be described more specifically.

It is assumed herein that the image forming apparatus 10 is in the normal standby state ST1 (the normal standby mode) in step S11.

In step S12, the image forming apparatus 10 determines whether or not a job is present. In step S13, next, the image forming apparatus 10 determines whether or not the shift timer period TM1 is elapsed without reception of an execution request for a job. The image forming apparatus 10 repeatedly performs the operations in steps S12 and S13 in the normal standby state ST1.

When the image forming apparatus 10 determines that a job (e.g., a facsimile receiving job) is received prior to the lapse of the shift timer period TM1 in step S12, the program proceeds to step S14. In step S14, the image forming apparatus 10 executes the received job.

On the other hand, when the shift timer period TM1 is elapsed without reception of a job, the program proceeds from step S13 to step S15. In step S15, the image forming apparatus 10 shifts from the normal standby state ST1 (the normal standby mode) to the power saving state ST2 (the sleep mode).

The image forming apparatus 10 continues to perform an operation of awaiting a job in the power saving state ST2 (step S16).

When determining that an execution request RQ for a job is received in step S16, the image forming apparatus 10 starts to perform a process of accepting the job. Specifically, the program proceeds from step S16 to step S21. In step S21, the image forming apparatus 10 starts to perform an operation of returning from the power saving state ST2 (the sleep mode). In other words, the image forming apparatus 10 starts to shift from the power saving state ST2 (the sleep mode) to the normal standby state ST1 (the normal standby mode).

In step S22, when the image forming apparatus 10 successfully accepts the job (succeeds in the reception of the job) in the power saving state ST2 (the sleep mode), the program proceeds to step S14. In step S14, the image forming apparatus 10 executes the received job.

On the other hand, in step S22, when the image forming apparatus 10 fails to accept the job (cannot successfully receive the job), the image forming apparatus 10 records information about the job reception failure (the first or second reception failure time in FIG. 5) on history information. Then, the program proceeds to step S25.

In step S25, the image forming apparatus 10 determines whether or not an operation of changing settings for the shift timer period TM is performed (step S26).

Specifically, the image forming apparatus 10 determines whether or not the job reception failure is the second one of the consecutive reception failures concerning the facsimile receiving job.

More specifically, when determining that the job reception failure is not the second one of the consecutive reception failures concerning the facsimile receiving job, the image forming apparatus 10 determines that the operation of changing the settings is not performed, and then the program proceeds to step S12. In other words, the image forming apparatus 10 remains on the normal standby state ST1.

For example, when the image forming apparatus 10 fails to accept the facsimile receiving job at the time T10 (FIG. 4), the program proceeds from step S22 to step S25. At the time T10, the image forming apparatus 10 fails to receive the facsimile receiving job for the first time. Therefore, the program proceeds from step S25 to step S12. Then, the image forming apparatus 10 remains on the normal standby state ST1 until the shift timer period TM set at the value TM1 is elapsed.

On the other hand, when determining that the job reception failure is the second one of the consecutive reception failures concerning the facsimile receiving job, the image forming apparatus 10 determines that the operation of changing the settings is performed, and then the program proceeds from step S25 to step S26. In step S26, the image forming apparatus 10 temporarily changes the shift timer period TM from the value TM1 to the different value TM2 (i.e., extends the shift timer period TM). In other words, the image forming apparatus 10 sets "a retry wait timer".

For example, when the image forming apparatus 10 fails to accept the facsimile receiving job again at the time T20 (FIG. 4), the program proceeds from step S22 to step S25. Moreover, this reception failure corresponds to the second reception failure concerning the facsimile receiving job (the consecutive reception failure). Therefore, the program further proceeds from step S25 to step S26.

As described above, then, the image forming apparatus 10 calculates the differential value TD (=T20−T10) of the difference between the times T10 and T20 at which the image forming apparatus 10 fails successively twice to receive the facsimile receiving job, and also calculates the value TM2 by adding the allowance value α to the differential value TD. Thus, the image forming apparatus 10 changes the shift timer period TM from the original value TM1 to the new value TM2.

Thereafter, the image forming apparatus 10 remains on the normal standby state ST1 until the shift timer period TM set at the value TM2 is elapsed. Specifically, the image forming apparatus 10 repeatedly performs the processes in steps S27 and S28.

When the shift timer period TM set at the value TM2 is elapsed without reception of the job, the program proceeds from step S28 to step S15. In step S15, the image forming apparatus 10 shifts from the normal standby state ST1 (the normal standby mode) to the power saving state ST2 (the sleep mode).

On the other hand, when the image forming apparatus 10 determines that the job is received during this standby period (the period during which processes in steps S27 and S28 are performed repeatedly), the program proceeds from step S27 to step S14. In step S14, the image forming apparatus 10 executes the job received successfully.

For example, when receiving the facsimile receiving job in the normal standby state ST1 at the time T30, the image forming apparatus 10 succeeds in the operation of accepting the facsimile receiving job (including the operation of acquiring the telephone number information of the transmitting side), so that the program proceeds from step S22 to step S14. In step S14, the image forming apparatus 10 executes the received facsimile receiving job (including an operation of printing out the contents of facsimile communication onto a sheet of paper, and other operations).

According to the operations described above, in principle, the image forming apparatus 10 shifts from the normal standby state ST1 (the normal standby mode) to the power saving state ST2 (the sleep mode) when the shift timer period TM (set at the original value TM1) is elapsed without reception of the execution request for the facsimile receiving job. Thus, reduction in power consumption is achieved. Particularly, a high power saving effect can be produced in such a manner that the value TM1 is set to be smaller.

Moreover, the image forming apparatus 10 extends the shift timer period TM in the case where the image forming apparatus 10 fails in the job acceptance which is started in the power saving state ST2 on the basis of the execution request RQ1 for the facsimile receiving job at a certain time (the time T10) (the acceptance of the facsimile receiving job) and also fails in the job acceptance which is started in the power saving state ST2 on the basis of the second execution request RQ2 subsequent to the execution request RQ10 at the time T20 (the acceptance of the facsimile receiving job). Specifically, the image forming apparatus 10 estimates the retry time interval TR1 of the transmitting-side apparatus on the basis of the differential value TD of the difference between the time T10 at which the first execution request RQ1 is received and the time T20 at which the second execution request RQ2 is received, thereby extending the shift timer period TM. Then, the image forming apparatus 10 awaits the third execution request RQ3 for the facsimile receiving job (the execution request subsequent to the execution request RQ2) in the normal standby state ST1.

Accordingly, in the case where the image forming apparatus 10 is hard to accept the retry reception in the shift timer period TM set at the original value TM1, the shift timer period TM is set at the new value TM2, that is, the shift timer period TM is extended on the basis of the estimated value of the retry time interval TR1 of the transmitting-side apparatus. Then, when receiving the execution request for the facsimile receiving job in the extended shift timer period TM, the image forming apparatus 10 is capable of starting to receive the facsimile receiving job in the non-sleep state (the normal standby state ST1). Therefore, the image forming apparatus 10 is capable of accepting the facsimile receiving job with higher reliability.

As described above, even when failing successively twice to perform the process of accepting a specific type job (the facsimile receiving job in this embodiment), the image forming apparatus 10 is capable of succeeding the third process of accepting the specific type job (the facsimile receiving job in this embodiment).

Particularly, the retry time interval TR1 is set by the transmitting-side apparatus, and therefore differs depending on a transmitting-side apparatus. For this reason, the value TM1 is set to be considerably large in order to deal with a large number of transmitting-side apparatuses without extending the shift timer period TM. However, the use of the value TM1 set to be large makes it difficult to achieve low power consumption.

Even in this case, according to this embodiment, it is possible to estimate the retry time interval and to suitably change the shift timer period TM from the original value TM1 to the new value TM2. Specifically, it is possible to prevent degradation in power consumption property by setting the value TM1 at a relatively low value (e.g., one to several minute(s)) and to accept the facsimile receiving job with high reliability in the normal standby state ST1 (the non-sleep state) by suitably setting the value TM2 which is the value of the extended shift timer period TM.

After the successful reception of the facsimile receiving job (for the third time), the extended shift timer period TM is changed from the value TM2 to the original value TM1 (the value before the extension). Moreover, even in the case where the shift timer period TM set at the value TM2 is elapsed without reception of the job, the shift timer period TM is changed to the original value TM1 (the value before the extension). The return of the shift timer period TM to the original value TM1 allows the promotion of power consumption again.

3. Modification Example and Others

The foregoing description is given of the preferred embodiment of the present invention; however, the present invention is not limited to this embodiment.

In the foregoing embodiment, with regard to the facsimile receiving job involving the reception of the transmitting-side number information (the caller number information), the image forming apparatus 10 determines that the facsimile receiving job is accepted successfully on the condition that the transmitting-side number information (NB1) to be transmitted prior to the facsimile data (the main data) in association with the call signal for facsimile communication is received successfully; however, the present invention is not limited thereto. Specifically, even in the case of failing to successfully receive the transmitting-side number information NB1 to be transmitted prior to the facsimile data in association with the call signal, the image forming apparatus 10 may determine that the facsimile receiving job is accepted successfully on condition that the facsimile data subsequent to the call signal is received successfully and transmitting-side number information NB2 is extracted from the facsimile data. Examples of the transmitting-side number information NB2 which can be extracted from the facsimile data may include transmitting-side number information contained in the header of the facsimile data (information which is printed on an upper end of a sheet of paper), and the like.

Figure 6:
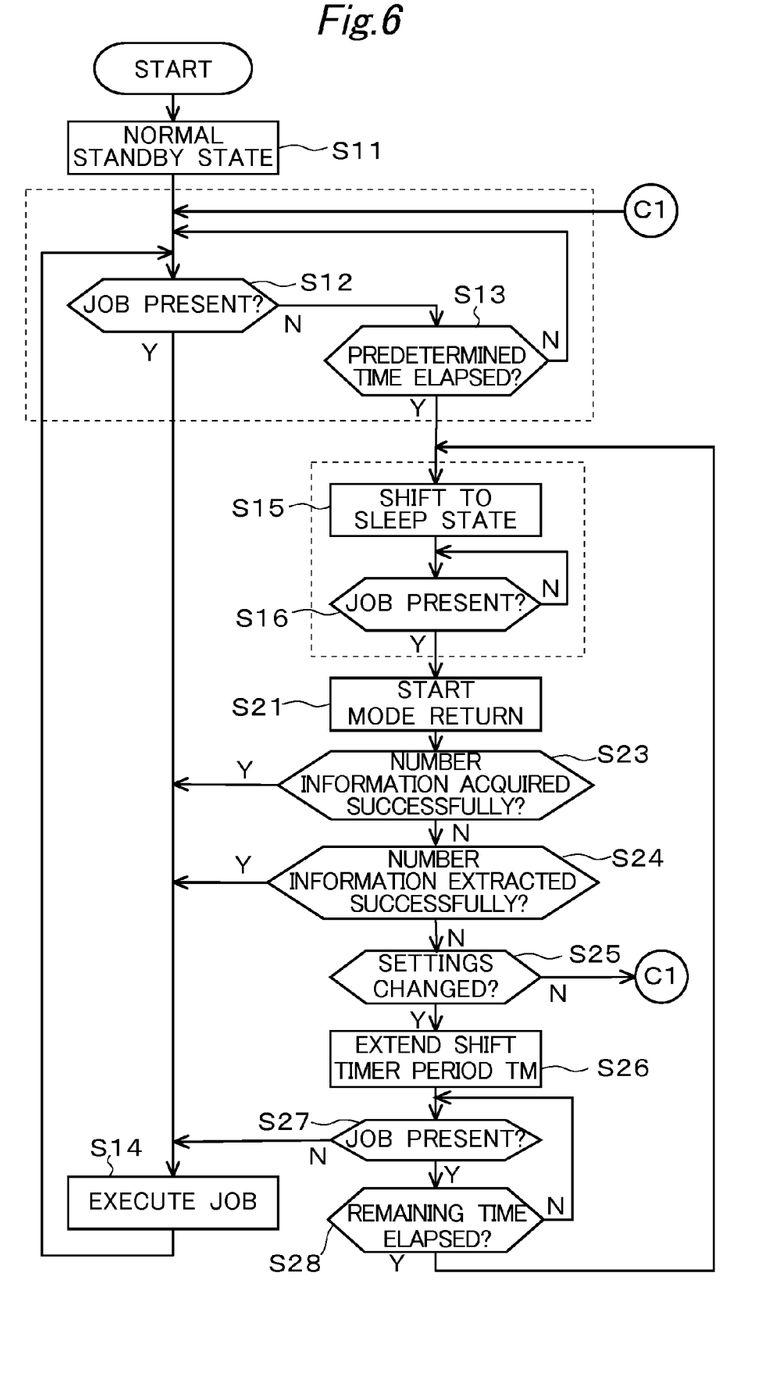
FIG. 6 is a flowchart showing operations according to a modification example.

FIG. 6 is a flowchart showing the operations according to the modification example described above. In FIG. 6, steps S23 and S24 are provided in place of step S22 in FIG. 3.

As shown in FIG. 6, in step S23, in the case of successfully receiving the transmitting-side number information (specifically, the transmitting-side number information to be transmitted prior to the facsimile data in association with the call signal for facsimile communication) NB1 associated with the call signal, the image forming apparatus 10 determines that the job is accepted successfully, and then the program proceeds to step S14. On the other hand, in the case of failing to successfully receive the transmitting-side number information NB1 associated with the call signal, the program proceeds to step S24. Herein, the image forming apparatus 10 continues to perform the operation of receiving the facsimile receiving job even when failing to receive the transmitting-side number information NB1.

With regard to the process in step S24, the image forming apparatus 10 determines that the job is accepted successfully when the facsimile data subsequent to the call signal is received successfully and the transmitting-side number information NB2, which is embedded in (the header of) the facsimile data, is extracted successfully from the facsimile data. Specifically, the transmitting-side number acquisition part 33 causes the controller 43 to continue to perform the operation of accepting the facsimile receiving job by using the transmitting-side number information NB2 rather than the original transmitting-side number information NB1 as the number information of the facsimile receiving job transmitting side. Then, the program proceeds from step S24 to step S14. Thus, it is possible to avoid the failure in reception of the facsimile receiving job, and therefore to avoid the retransmission (retry communication) from the transmitting-side apparatus to the receiving-side apparatus. Hence, it is possible to reduce power consumption by avoiding the operation that the receiving-side apparatus returns from the power saving state ST2 in association with the retry communication.

On the other hand, in the case where the transmitting-side number information NB2 is not extracted from (the header of) the facsimile data, the image forming apparatus 10 determines that the acquisition of the transmitting-side number information is failed, and also determines that the acceptance of the facsimile receiving job is failed. Then, the program proceeds from step S24 to step S25. Moreover, in the case where the facsimile data subsequent to the call signal is not received successfully, determinations similar to those described above are made. Then, the program proceeds from step S24 to step S25. Thereafter, operations similar to those in the foregoing embodiment are performed.

In the foregoing embodiment and the like, moreover, the image forming apparatus 10 is set so as to determine that the facsimile receiving job is received successfully on the condition that the telephone number (the facsimile number) of the counterpart (the transmitting side) is acquired, fails to receive the telephone number of the counterpart, and also fails to accept the facsimile receiving job; however, the present invention is not limited thereto. For example, the foregoing idea may be applied to a case where the image forming apparatus 10 returns from the power saving state ST2 to the normal standby state ST1 (or the operative state) behind schedule because of any other reasons and, therefore, fails to accept the facsimile receiving job.

In the foregoing embodiment and the like, further, in the case where the telephone number of the transmitting side (the counterpart) cannot be identified, when the image forming apparatus 10 fails successively twice to receive the facsimile data, the image forming apparatus 10 determines that the image forming apparatus 10 fails successively twice to accept the same facsimile receiving job, and then estimates that the differential value TD corresponds to the retry time interval TR1 of the transmitting-side apparatus; however, the present invention is not limited thereto. For example, the image forming apparatus 10 may determine that the image forming apparatus 10 fails successively twice to accept the single facsimile receiving job (from the single transmitting side), on the basis of the telephone number of the transmitting side (the counterpart), and then may estimate that the differential value TD corresponds to the retry time interval TR1 of the transmitting-side apparatus.

In the foregoing embodiment and the like, furthermore, the shift timer period TM is set at the value TM2 which is larger by a predetermined amount (a positive value $\alpha$) than the differential value TD of the difference between the time at which the execution request RQ1 is received and the time at which the execution request RQ2 is received (TM2=TD+$\alpha$); however, the present invention is not limited thereto. For example, the shift timer period TM may be set at a value which is equal to the differential value TD. Preferably, the shift timer period TM is changed to a period having a value which is equal to or more than the differential value TD.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus comprising:
 a reception part for receiving an execution request for a job involving image processing from an external apparatus; and
 a state control part for switching between a first state which allows a process of accepting the job and a second state which is lower in power consumption than the first state, wherein
 when the first state continues over a shift timer period without reception of the execution request, the state control part performs an operation of shifting from the first state to the second state,
 when reception of the job is started in the second state in response to the execution request, the state control part performs an operation of shifting from the second state to the first state in order to perform the process of accepting the job, and
 in a case where job acceptance started in the second state on the basis of a first execution request is failed and job acceptance started in the second state on the basis of a second execution request is also failed, the state control part extends the shift timer period on the basis of a differential value of a difference between a first execution request reception time and a second execution request reception time, and causes the reception part to await a third execution request for the job in the first state.

2. The image forming apparatus according to claim 1, wherein
 the job involving the image processing is a facsimile receiving job.

3. The image forming apparatus according to claim 1, wherein
 the job involving the image processing is a facsimile receiving job involving reception of number information of a transmitting side, the image forming apparatus further comprising
a transmitting-side number acquisition part for acquiring number information of a facsimile receiving job transmitting side.

4. The image forming apparatus according to claim 3, wherein
even when reception of first transmitting-side number information to be transmitted prior to facsimile data in association with a call signal for facsimile communication is failed, the transmitting-side number acquisition part continues to perform the operation of receiving the facsimile receiving job, and
in a case where second transmitting-side number information is extracted from the facsimile data received with regard to the facsimile receiving job, the transmitting-side number acquisition part continues to perform the operation of accepting the facsimile receiving job by using the second transmitting-side number information rather than the first transmitting-side number information as the number information of the facsimile receiving job transmitting side.

5. The image forming apparatus according to claim 4, wherein
even when the reception of the first transmitting-side number information is failed, the transmitting-side number acquisition part continues to perform the operation of receiving the facsimile receiving job,
in a case where the second transmitting-side number information is not extracted from the facsimile data received with regard to the facsimile receiving job, the transmitting-side number acquisition part makes a determination that the acquisition of the number information of the transmitting side is failed, and
when the transmitting-side number acquisition part makes the determination that the acquisition of the number information of the transmitting side is failed, the state control part makes a determination that the acceptance of the facsimile receiving job is failed.

6. The image forming apparatus according to claim 1, wherein
the shift timer period is extended to have a value which is equal to or more than the differential value of the difference between the first execution request reception time and the second execution request reception time.

7. A method for controlling an image forming apparatus, comprising the steps of:
(a) performing an operation of shifting from a first state in which an execution request for a job involving image processing is awaited to a second state which is lower in power consumption than the first state when the first state continues over a shift timer period without reception of the execution request;
(b) performing an operation of shifting from the second state to the first state in order to perform a process of accepting the job when reception of the job is started in the second state in response to the execution request; and
(c) extending, in a case where job acceptance started in the second state on the basis of a first execution request is failed and job acceptance started in the second state on the basis of a second execution request is also failed, the shift timer period on the basis of a differential value of a difference between a first execution request reception time and a second execution request reception time, and awaiting a third execution request for the job in the first state.

8. The method according to claim 7, wherein
the job involving the image processing is a facsimile receiving job.

9. The method according to claim 7, wherein
the job involving the image processing is a facsimile receiving job involving reception of number information of a transmitting side.

10. The method according to claim 9, wherein
on an occasion of acceptance of the facsimile receiving job,
even when reception of first transmitting-side number information to be transmitted prior to facsimile data in association with a call signal for facsimile communication is failed, the operation of receiving the facsimile receiving job is continued, and
in a case where second transmitting-side number information is extracted from the facsimile data received with regard to the facsimile receiving job, the operation of accepting the facsimile receiving job is continued by using the second transmitting-side number information rather than the first transmitting-side number information as the number information of the facsimile receiving job transmitting side.

11. The method according to claim 10, wherein
on an occasion of acceptance of the facsimile receiving job,
in a case where the second transmitting-side number information is not extracted from the facsimile data received with regard to the facsimile receiving job, a determination is made that the acquisition of the number information of the transmitting side is failed, and
when the determination is made that the acquisition of the number information of the transmitting side is failed, a determination is made that the acceptance of the facsimile receiving job is failed.

12. The method according to claim 7, wherein
in the step (c), the shift timer period is extended to have a value which is equal to or more than the differential value of the difference between the first execution request reception time and the second execution request reception time.

13. A non-transitory computer-readable recording medium for recording a program that causes a computer incorporated in an image forming apparatus to execute the steps of:
(a) performing an operation of shifting from a first state in which an execution request for a job involving image processing is awaited to a second state which is lower in power consumption than the first state when the first state continues over a shift timer period without reception of the execution request;
(b) performing an operation of shifting from the second state to the first state in order to perform a process of accepting the job when reception of the job is started in the second state in response to the execution request; and
(c) extending, in a case where job acceptance started in the second state on the basis of a first execution request is failed and job acceptance started in the second state on the basis of a second execution request is also failed, the shift timer period on the basis of a differential value of a difference between a first execution request reception time and a second execution request reception time, and awaiting a third execution request for the job in the first state.

14. The recording medium according to claim 13, wherein
the job involving the image processing is a facsimile receiving job.

15. The recording medium according to claim 13, wherein the job involving the image processing is a facsimile receiving job involving reception of number information of a transmitting side.

16. The recording medium according to claim 15, wherein on an occasion of acceptance of the facsimile receiving job,
even when reception of first transmitting-side number information to be transmitted prior to facsimile data in association with a call signal for facsimile communication is failed, the operation of receiving the facsimile receiving job is continued, and
in a case where second transmitting-side number information is extracted from the facsimile data received with regard to the facsimile receiving job, the operation of accepting the facsimile receiving job is continued by using the second transmitting-side number information rather than the first transmitting-side number information as the number information of the facsimile receiving job transmitting side.

17. The recording medium according to claim 16, wherein on an occasion of acceptance of the facsimile receiving job,
in a case where the second transmitting-side number information is not extracted from the facsimile data received with regard to the facsimile receiving job, a determination is made that the acquisition of the number information of the transmitting side is failed, and
when the determination is made that the acquisition of the number information of the transmitting side is failed, a determination is made that the acceptance of the facsimile receiving job is failed.

18. The recording medium according to claim 13, wherein in the step (c), the shift timer period is extended to have a value which is equal to or more than the differential value of the difference between the first execution request reception time and the second execution request reception time.

* * * * *